United States Patent
Hung

(10) Patent No.: US 9,611,383 B2
(45) Date of Patent: Apr. 4, 2017

(54) CURABLE FLUOROELASTOMER COMPOSITION

(71) Applicant: E. I. DU PONT DE NEMOURS AND COMPANY, Wilmington, DE (US)

(72) Inventor: Ming-Hong Hung, Wilmington, DE (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 0 days.

(21) Appl. No.: 15/035,607

(22) PCT Filed: Nov. 24, 2014

(86) PCT No.: PCT/US2014/067125
§ 371 (c)(1),
(2) Date: May 10, 2016

(87) PCT Pub. No.: WO2015/077707
PCT Pub. Date: May 28, 2015

(65) Prior Publication Data
US 2016/0280902 A1 Sep. 29, 2016

Related U.S. Application Data

(60) Provisional application No. 61/908,299, filed on Nov. 25, 2013.

(51) Int. Cl.
| | | |
|---|---|---|
| C08L 23/00 | (2006.01) |
| C08L 27/22 | (2006.01) |
| C08L 27/12 | (2006.01) |
| C08L 27/18 | (2006.01) |
| C08L 41/00 | (2006.01) |

(52) U.S. Cl.
CPC .............. *C08L 27/22* (2013.01); *C08L 27/12* (2013.01); *C08L 27/18* (2013.01); *C08L 41/00* (2013.01); *C08L 2205/02* (2013.01)

(58) Field of Classification Search
CPC .......... C08L 27/22; C08L 27/12; C08L 27/18; C08L 41/00; C08L 2205/02
See application file for complete search history.

(56) References Cited

U.S. PATENT DOCUMENTS

| | | | |
|---|---|---|---|
| 4,281,092 A | 7/1981 | Breazeale | |
| 4,394,489 A | 7/1983 | Aufdermarsh et al. | |
| 5,789,489 A | 8/1998 | Coughlin et al. | |
| 5,789,509 A | 8/1998 | Schmiegel | |
| 6,365,693 B1 | 4/2002 | Hung | |
| 8,288,005 B2 | 10/2012 | Manzara et al. | |
| 8,288,482 B2 | 10/2012 | Hung et al. | |
| 8,501,872 B2* | 8/2013 | Hung et al. .............. | C08K 5/28 525/326.3 |
| 2010/0324222 A1* | 12/2010 | Hung et al. .............. | C08K 5/28 525/200 |
| 2011/0039960 A1 | 2/2011 | Xu et al. | |

FOREIGN PATENT DOCUMENTS

| | | |
|---|---|---|
| WO | 2010147697 A2 | 12/2010 |
| WO | 2011084404 A1 | 7/2011 |

OTHER PUBLICATIONS

International Search Report, European Patent Office, P. B. 5818 Patentlaan 2, NL-2280 HV Rijswijk; in PCTUS2014/067125; PCT Counterpart of present application 15035607, Luis Rodriguez Authorized Officer; Feb. 23, 2015.
Fournier et al; Clicking polymers: a straightforward approach to novel macromolecular architectures; Chemical Society Reviews; vol. 36, No. 8; May 3, 2007; pp. 1369.
Tillet; Utilisation de la reaction de cycloaddition de huisgen afin d'ameliorer les proprieties des polymers fluores; These Doctorale; Nov. 16, 2010; pp. 1-110.

\* cited by examiner

*Primary Examiner* — Nathan M Nutter

(57) ABSTRACT

Compositions comprising fluoroelastomers having copolymerized units of a cyano-containing cure site monomer are cured (i.e. crosslinked) with a fluoropolymer having pendant sulfonyl azide groups. The latter fluoropolymer comprises copolymerized units of a fluoroalkanesulfonyl azide of formula $CF_2=CF-(O)_p-R_f-(CH_2)_n-SO_2N_3$, wherein p=0 or 1; n=0-4; and $R_f$ is a $C_1$-$C_{16}$ perfluoroalkyl or perfluoroalkoxy group. The crosslinks are tetrazole rings formed by the reaction of the pendant sulfonyl azide groups on the fluoropolymer with pendant cyano groups on the fluoroelastomer.

2 Claims, No Drawings

CURABLE FLUOROELASTOMER COMPOSITION

FIELD OF THE INVENTION

This invention relates to curable fluoroelastomer compositions wherein the fluoroelastomer has cyano group cure sites and the curative is a fluoropolymer having pendant sulfonyl azide groups.

BACKGROUND OF THE INVENTION

Fluoroelastomers have achieved outstanding commercial success and are used in a wide variety of applications in which severe environments are encountered, in particular those end uses where exposure to high temperatures and aggressive chemicals occurs. For example, these polymers are often used in seals for aircraft engines, in oil-well drilling devices, and in sealing elements for industrial equipment that operates at high temperatures.

The outstanding properties of fluoroelastomers are largely attributable to the stability and inertness of the copolymerized fluorinated monomer units that make up the major portion of the polymer backbones in these compositions. Such monomers include vinylidene fluoride, hexafluoropropylene, tetrafluoroethylene and perfluoro(alkyl vinyl) ethers. In order to develop elastomeric properties fully, fluoroelastomers are typically crosslinked, i.e. vulcanized. To this end, a small percentage of cure site monomer is copolymerized with the fluorinated monomer units. Cure site monomers containing at least one cyano group, for example perfluoro-8-cyano-5-methyl-3,6-dioxa-1-octene, are especially preferred. Such compositions are described in U.S. Pat. Nos. 4,281,092; 4,394,489; 5,789,489; 5,789,509 and in WO 2011084404.

U.S. Pat. No. 8,288,005 B2 discloses perfluoroelastomers having cyano cure sites that are cured with certain aliphatic mono-, di- and poly-azides. However, these azides may be difficult to synthesize and can be challenging to purify via distillation. The azides tend to have poor stability (both thermal and explosive). Also the azides are usually liquids at room temperature which can make it difficult to compound with fluoroelastomers.

U.S. Pat. No. 8,288,482 B2 discloses perfluoroelastomers having cyano cure sites that are cured with certain diazides. These diazides may suffer from many of the deficiencies mentioned above.

Fluoropolymers having pendant sulfonyl azide groups are disclosed in U.S. Pat. No. 6,365,693 B1. These fluoropolymers generally have good chemical stability, so they are relatively easy to handle.

SUMMARY OF THE INVENTION

Surprisingly, it has been discovered that fluoropolymers having pendant sulfonyl azide groups may be employed as curatives for fluoroelastomers having pendant cyano groups even though the curatives provides steric hindrance to the crosslinking reaction. The curable compositions exhibit good curing characteristics (e.g. cure rate and cure level) and result in cured fluoroelastomer compositions having good physical properties.

The present invention is directed to a curable fluoroelastomer composition which comprises a fluoroelastomer having cyano group cure sites and a fluoropolymer having pendant sulfonyl azide groups. More specifically, the present invention is directed to a curable composition comprising:

A) a fluoroelastomer comprising copolymerized units of a cyano group-containing cure site monomer; and
B) at least one fluoropolymer comprising copolymerized units of a fluoroalkanesulfonyl azide of formula $CF_2=CF-(O)_p-R_f-(CH_2)_n-SO_2N_3$, wherein $p=0$ or 1; $n=0\text{-}4$; and $R_f$ is a $C_1\text{-}C_{16}$ perfluoroalkyl or perfluoroalkoxy group.

Another aspect of the present invention is a cured article made from the above composition.

DETAILED DESCRIPTION OF THE INVENTION

The fluoroelastomer that may be employed in the composition of the invention may be partially fluorinated or perfluorinated. Fluoroelastomers preferably contain between 25 and 70 weight percent, based on the total weight of the fluoroelastomer, of copolymerized units of a first monomer which may be vinylidene fluoride ($VF_2$) or tetrafluoroethylene (TFE). The remaining units in the fluoroelastomers are comprised of one or more additional copolymerized monomers, different from said first monomer, selected from the group consisting of fluoromonomers, hydrocarbon olefins and mixtures thereof. Fluoromonomers include fluorine-containing olefins and fluorine-containing vinyl ethers.

Fluorine-containing olefins which may be employed to make fluoroelastomers include, but are not limited to vinylidene fluoride ($VF_2$), hexafluoropropylene (HFP), tetrafluoroethylene (TFE), 1,2,3,3,3-pentafluoropropene (1-HPFP), 1,1,3,3,3-pentafluoropropene (2-HPFP), chlorotrifluoroethylene (CTFE) and vinyl fluoride.

Fluorine-containing vinyl ethers that may be employed to make fluoroelastomers include, but are not limited to perfluoro(alkyl vinyl) ethers. Perfluoro(alkyl vinyl) ethers (PAVE) suitable for use as monomers include those of the formula $$CF_2=CFO(R_f'-O)_n(R_{f''}-O)_mR_f \qquad (I)$$

where $R_{f'}$ and $R_{f''}$ are different linear or branched perfluoroalkylene groups of 2-6 carbon atoms, m and n are independently 0-10, and $R_f$ is a perfluoroalkyl group of 1-6 carbon atoms.

A preferred class of perfluoro(alkyl vinyl) ethers includes compositions of the formula $$CF_2=CFO(CF_2CFXO)_nR_f \qquad (II)$$

where X is F or $CF_3$, n is 0-5, and $R_f$ is a perfluoroalkyl group of 1-6 carbon atoms.

A most preferred class of perfluoro(alkyl vinyl) ethers includes those ethers wherein n is 0 or 1 and $R_f$ contains 1-3 carbon atoms. Examples of such perfluorinated ethers include perfluoro(methyl vinyl ether) (PMVE), perfluoro (ethyl vinyl ether) (PEVE) and perfluoro(propyl vinyl ether) (PPVE). Other useful monomers include those of the formula $$CF_2=CFO[(CF_2)_mCF_2CFZO]_nR_f \qquad (III)$$

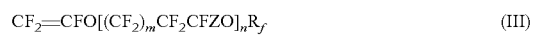

where $R_f$ is a perfluoroalkyl group having 1-6 carbon atoms, $m=0$ or 1, $n=0\text{-}5$, and $Z=F$ or $CF_3$. Preferred members of this class are those in which $R_f$ is $C_3F_7$, $m=0$, and $n=1$.

Additional perfluoro(alkyl vinyl) ether monomers include compounds of the formula $$CF_2=CFO[(CF_2CF\{CF_3\}O)_n(CF_2CF_2CF_2O)_m(CF_2)_p]C_xF_{2x+1} \qquad (IV)$$

where m and n independently $=0\text{-}10$, $p=0\text{-}3$, and $x=1\text{-}5$. Preferred members of this class include compounds where $n=0\text{-}1$, $m=0\text{-}1$, and $x=1$.

Other examples of useful perfluoro(alkyl vinyl ethers) include $$CF_2\!=\!CFOCF_2CF(CF_3)O(CF_2O)_mC_nF_{2n+1} \quad (V)$$

where n=1-5, m=1-3, and where, preferably, n=1.

If copolymerized units of PAVE are present in fluoroelastomers employed in the invention, the PAVE content generally ranges from 25 to 75 weight percent, based on the total weight of the fluoroelastomer. If perfluoro(methyl vinyl ether) is used, then the fluoroelastomer preferably contains between 30 and 65 wt. % copolymerized PMVE units.

Hydrocarbon olefins useful in the fluoroelastomers employed in the invention include, but are not limited to, ethylene and propylene. If copolymerized units of a hydrocarbon olefin are present in the fluoroelastomers, hydrocarbon olefin content is generally 4 to 30 weight percent.

The fluoroelastomer further contains copolymerized units of at least one cure site monomer, generally in amounts of from 0.1-5 mole percent. The range is preferably between 0.3-1.5 mole percent. Although more than one type of cure site monomer may be present, most commonly one cure site monomer is used and it contains at least one cyano substituent group. Suitable cure site monomers include cyano-containing fluorinated olefins and cyano-containing fluorinated vinyl ethers. Useful cyano-containing cure site monomers include those of the formulas shown below.

$$CF_2\!=\!CF\!-\!O(CF_2)_n\!-\!CN \quad (VI)$$

where n=2-12, preferably 2-6;

$$CF_2\!=\!CF\!-\!O[CF_2\!-\!CFCF_3\!-\!O]_n\!-\!CF_2\!-\!CFCF_3\!-\!CN \quad (VII)$$

where n=0-4, preferably 0-2;

$$CF_2\!=\!CF\!-\![OCF_2CFCF_3]_x\!-\!O\!-\!(CF_2)_n\!-\!CN \quad (VIII)$$

where x=1-2, and n=1-4; and $$CF_2\!=\!CF\!-\!O\!-\!(CF_2)_n\!-\!O\!-\!CF(CF_3)CN \quad (IX)$$

where n=2-4.

Those of formula (VIII) are preferred. Especially preferred cure site monomers are perfluorinated polyethers having a cyano group and a trifluorovinyl ether group. A most preferred cure site monomer is $$CF_2\!=\!CFOCF_2CF(CF_3)OCF_2CF_2CN \quad (X)$$

i.e. perfluoro(8-cyano-5-methyl-3,6-dioxa-1-octene) or 8-CNVE.

Fluoroelastomers that may be employed in the invention have a number average molecular weight (Mn) in the range of 10,000 to 250,000.

A first aspect of this invention is a curable composition comprising A) a fluoroelastomer comprising copolymerized units of a cyano group-containing cure site monomer; and B) a certain fluoropolymer having pendant sulfonyl azide groups. The latter fluoropolymers are described in U.S. Pat. No. 6,365,693 B1.

The pendant sulfonyl azide groups result from the incorporation into the fluoropolymer of copolymerized units of a fluoroalkanesulfonyl azide having the formula $CF_2\!=\!CF\!-\!(O)_p\!-\!R_f\!-\!(CH_2)_n\!-\!SO_2N_3$, wherein p=0 or 1; n=0—4; and $R_f$ is a $C_1\!-\!C_{16}$ perfluoroalkyl or perfluoroalkoxy group. Preferably, p=1; n=0; and $R_f$ is selected from the group consisting of $-\!CF_2CF(CF_3)OCF_2CF_2\!-$ and $-\!(CF_2)_m\!-$, wherein m=2-4. Specifically, these fluoroalkanesulfonyl azides include, but are not limited to, $CF_2\!=\!CFOCF_2CF(CF_3)OCF_2CF_2\!-\!SO_2N_3$ (8-SAVE); $CF_2\!=\!CFOCF_2CF_2\!-\!SO_2N_3$; $CF_2\!=\!CFOCF_2CF_2CF_2\!-\!SO_2N_3$; and $CF_2\!=\!CFOCF_2CF_2CF_2CF_2\!-\!SO_2N_3$.

Fluoropolymers having sulfonyl azide pendant groups comprise copolymerized i) units derived from the fluoroalkanesulfonyl azide defined above and ii) units derived from at least one other fluorinated monomer. By "other fluorinated monomer" is meant a copolymerizable fluoromonomer other than a fluoroalkanesulfonyl azide. In addition, copolymers may optionally contain units derived from one or more fluorine-free monomers.

Preferably, units derived from the fluoroalkanesulfonyl azide are present in minor amounts in the fluoropolymers having sulfonyl azide pendant groups. Typically, fluoropolymers contain 0.02-10 mole percent (based on the total monomer units in the polymer) of units derived from the fluoroalkanesulfonyl azide, preferably 0.1-5 mole percent and most preferably 0.3-3 mole percent.

Fluorinated monomers suitable for forming copolymers with the fluoroalkanesulfonyl azide include, but are not limited to: tetrafluoroethylene (TFE); chlorotrifluoroethylene (CTFE); trifluoroethylene; vinylidene fluoride ($VF_2$); vinyl fluoride (VF); hexfluoropropylene (HFP); 1- or 2-hydropentafluoropropylene; 3,3,3-trifluoropropylene; hexafluoroisobutylene; perfluoro(alkyl vinyl ethers) (PAVE) having alkyl groups containing 1-5 carbon atoms (preferably 1-3 carbon atoms); perfluoro(alkoxy vinyl ethers) having alkoxy groups containing 1-5 carbon atoms; perfluoro-(2,2-dimethyl-1,3-dioxole) (PDD) and perfluoro-(2-methylene-4-methyl-1,3-dioxolane) (PMD). Also included in this group of fluorinated monomers are perfluoro(alkyl vinyl ethers) which contain functional groups such as acid fluorides or esters. Examples of these ethers include $CF_2\!=\!CFOCF_2CF(CF_3)OCF_2CF_2SO_2F$ (PSEPVE) and $CF_2\!=\!CFOCF_2CF(CF_3)OCF_2CF_2COOCH_3$ (EVE). Preferably, at least one of the fluorinated monomers is selected from the group consisting of TFE, CTFE and $VF_2$.

Fluorine free monomers that can be used in the fluoropolymers having pendant sulfonyl azide groups include: ethylene, propylene, n-butylene, iso-butylene, vinyl acetate (VAc), and vinyl ethers such as methyl vinyl ether.

The fluoropolymers having pendant sulfonyl azide groups may be glassy, thermoplastic or elastomeric. They may be amorphous or partially crystalline, melt-fabricable or non-melt-fabricable. One skilled in the art will readily recognize that such polymer properties are controlled by the type of monomers used in the copolymer and their relative levels.

Typical elastomeric fluoropolymers having pendant sulfonyl azide groups comprise, in addition to minor amounts of units derived from the fluoroalkanesulfonyl azide, units derived from a combination of monomers selected from the group consisting of a) $VF_2$ and HFP; b) $VF_2$, HFP and TFE; c) $VF_2$, PAVE and TFE; d) TFE and PAVE; e) TFE and propylene; f) TFE, $VF_2$ and propylene; and g) TFE, PAVE and ethylene.

Typical thermoplastic fluoropolymers having pendant sulfonyl azide groups comprise, in addition to units derived from the fluoroalkanesulfonyl azide, units derived from either TFE or CTFE and up to 10 mole percent of one or more additional monomers such as HFP, PDD, PMD and ethylene.

Fluoropolymers having pendant sufonyl azide groups typically have a number average molecular weight (Mn) in the range of 10,000 to 250,000.

These fluoropolymers having pendant sulfonyl azide groups crosslink the fluoroelastomer copolymer by reacting with pendant cyano groups on the fluoroelastomer polymer chains to form tetrazole rings. The resulting crosslinks are stable to high temperatures.

In order to be useful as a curative for fluoroelastomers having cyano cure sites, the level of fluoropolymer having pendant sulfonyl azide groups should be about 30 to 250 parts per 100 parts of the fluoroelastomer having cyano cure sites, preferably about 50 to 150 parts fluoropolymer having pendant sulfonyl azide groups per 100 parts of the fluoroelastomer having cyano cure sites. As used herein, "parts" refers to parts by weight, unless otherwise indicated.

Optionally, the curable compositions of the invention may further comprise 0.1 to 3 parts of a metal halide, e.g. $ZnCl_2$ or CuBr, per 100 parts fluoroelastomer. The metal halide catalyzes the crosslinking reaction to form tetrazole rings.

Additives, such as carbon black, fluoropolymer micropowders, stabilizers, plasticizers, lubricants, fillers, and processing aids typically utilized in fluoroelastomer compounding can be incorporated into the compositions of the present invention, provided they have adequate stability for the intended service conditions.

The curable compositions of the invention may be prepared by mixing the fluoroelastomer having pendant cyano groups, fluoropolymer having pendant sulfonyl azide groups and other components using standard rubber compounding procedures. For example, the components may be mixed on a two roll rubber mill, in an internal mixer (e.g. a Banbury® internal mixer), or in an extruder. The curable compositions may then be crosslinked (i.e. cured) by application of heat and/or pressure. When compression molding is utilized, a press cure cycle is generally followed by a post cure cycle during which the press cured composition is heated at elevated temperatures in excess of 200° C. for several hours.

The curable compositions of the present invention are useful in production of gaskets, tubing, and seals. Such cured articles are generally produced by molding a compounded formulation of the curable composition with various additives under pressure, curing the part, and then subjecting it to a post cure cycle.

Other fluoropolymers containing cyano cure sites, such as fluoroplastics may be substituted for fluoroelastomers in the compositions of the invention.

Also the curable compositions of the invention may optionally contain (in addition to the fluoropolymer having pendant sulfonyl azide groups) more than one type of curative commonly employed in the crosslinking of fluoroelastomers, e.g. organic peroxide, diamino bisphenol AF, urea, an organotin compound such as tetraphenyltin, etc.

The invention is now illustrated by certain embodiments wherein all parts are by weight unless otherwise specified.

EXAMPLES

Test Methods

Cure Characteristics

Cure characteristics were measured using a Monsanto MDR 2000 instrument under the following conditions:
Moving die frequency: 1.66 Hz
Oscillation amplitude: ±0.5 degrees
Temperature: 199° C., unless otherwise noted
Sample size: Disks having diameter of 1.5 inches (38 mm)
Duration of test: 30 minutes
The following cure parameters were recorded:
$M_H$: maximum torque level, in units of dN·m
$M_L$: minimum torque level, in units of dN·m
Tc90: time to 90% of maximum torque, minutes Test specimens were prepared from elastomer compounded with appropriate additives, as described in the formulations listed in the Examples below. Compounding was carried out on a rubber mill. The milled composition was formed into a sheet and a 10 g sample was die cut into a disk to form the test specimen.

Compression set of O-ring samples was determined in accordance with ASTM D395-89, 25% deflection for 70 hours at 200° C. Mean values are reported.

The following fluoroelastomer polymer was used in the Examples: A terpolymer containing 61.8 mole percent units of TFE, 37.4 mole percent units of PMVE and 0.8 mole percent units of 8-CNVE was prepared according to the general process described in U.S. Pat. No. 5,789,489.

The following fluoropolymer having pendant sufonyl azide groups was employed as the curative in the Examples: A terpolymer containing 65.4 mole percent units of TFE, 33.3 mole percent units of PMVE and 1.35 mole percent units of 8-SAVE was prepared according to the general process described in U.S. Pat. No. 6,365,693 B1.

Examples 1-3

Curable compositions of the invention were compounded on a two-roll rubber mill in the proportions shown in Table I. Cure characteristics of the compounded compositions are also shown in Table I.

O-rings were made by press curing at 199° C., followed by a post cure under nitrogen at 305° C. for 42 hours. Compression set values of the o-rings are also shown in Table I.

TABLE I

|  | Ex. 1 | Ex. 2 | Ex. 3 |
| --- | --- | --- | --- |
| Formulation (phr)[1] |  |  |  |
| Fluoroelastomer | 100 | 100 | 100 |
| Carbon Black MT N990 | 30 | 30 | 30 |
| Curative | 100 | 100 | 100 |
| $ZnCl_2$ | 0 | 1.0 | 0 |
| CuBr | 0 | 0 | 1.0 |
| Cure Characteristics |  |  |  |
| $M_L$ (dN · m) | 2.74 | 2.75 | 3.61 |
| $M_H$ (dN · m) | 13.11 | 11.93 | 12.47 |
| Tc90, minutes | 0.90 | 0.90 | 0.82 |
| Compression set |  |  |  |
| % | 35.0 | 48.0 | 45.0 |

[1]Parts per hundred parts fluoroelastomer

What is claimed is:
1. A curable composition comprising:
A) a fluoroelastomer comprising copolymerized units of a cyano group-containing cure site monomer; and
B) at least one fluoropolymer comprising copolymerized units of a fluoroalkanesulfonyl azide of formula $CF_2=CF-(O)_p-R_f-(CH_2)_n-SO_2N_3$, wherein p=0 or 1; n=0-4; and $R_f$ is a $C_1$-$C_{16}$ perfluoroalkyl or perfluoroalkoxy group.
2. A cured article made from the composition of claim 1.

* * * * *